United States Patent
Zheng et al.

(10) Patent No.: US 8,758,645 B2
(45) Date of Patent: Jun. 24, 2014

(54) BLUE PHASE LIQUID CRYSTAL COMPOSITION, BLUE PHASE LIQUID CRYSTAL MATERIAL AND METHOD FOR MANUFACTURING THEREOF

(71) Applicants: Infovision Optoelectronics (Kunshan) Co., Ltd., KunShan (CN); East China University of Science and Technology, Shanghai (CN)

(72) Inventors: Zhi-gang Zheng, Shanghai (CN); Hai-feng Wang, Shanghai (CN); Dong Shen, Shanghai (CN)

(73) Assignees: Infovision Optoelectronics (Kunshan) Co., Ltd., KunShan (CN); East China University of Science and Technology, Shanghai (CN)

( * ) Notice: Subject to any disclaimer, the term of this patent is extended or adjusted under 35 U.S.C. 154(b) by 9 days.

(21) Appl. No.: 13/666,946

(22) Filed: Nov. 1, 2012

(65) Prior Publication Data
US 2013/0153822 A1    Jun. 20, 2013

(30) Foreign Application Priority Data

Dec. 15, 2011    (CN) .......................... 2011 1 0420544

(51) Int. Cl.
| | |
|---|---|
| *C09K 19/20* | (2006.01) |
| *C09K 19/52* | (2006.01) |
| *C09K 19/30* | (2006.01) |
| *C09K 19/06* | (2006.01) |
| *C09K 19/00* | (2006.01) |
| *B01J 19/12* | (2006.01) |
| *C01B 31/00* | (2006.01) |

(52) U.S. Cl.
USPC .............. 252/299.64; 252/299.01; 252/299.6; 252/299.63; 428/1.1; 428/1.3; 204/157.4; 204/157.47

(58) Field of Classification Search
USPC ............... 252/299.01, 299.6, 299.63, 299.64; 428/1.1, 1.3; 204/157.4, 157.47
See application file for complete search history.

(56) References Cited

U.S. PATENT DOCUMENTS

| | | | |
|---|---|---|---|
| 2009/0322997 A1 | 12/2009 | Kaihoko et al. | |
| 2011/0007260 A1* | 1/2011 | Chien et al. | ................... 349/186 |

FOREIGN PATENT DOCUMENTS

CN    102033353 A    4/2011

OTHER PUBLICATIONS

Hirotsugu Kikuchi, Masayuki Yokota, Yoshiaki Hisakado, Huai Yang, and Tisato Kajiyama, "Polymer-stabilized liquid crystal blue phases", Nature Materials 1, pp. 64-68 (2002).

* cited by examiner

*Primary Examiner* — Geraldina Visconti
(74) *Attorney, Agent, or Firm* — Ding Yu Tan

(57) ABSTRACT

A blue phase liquid crystal material includes a liquid crystal host, a chiral reagent and a stable polymer. The chiral reagent is R811. The stable polymer is formed by photo-polymerizing a first monomer and a second monomer. The first monomer is 2-ethylhexyl acrylate (2-EHA), and the second monomer is 2-methyl-1,4-bis{4-[3(-acrylate)propoxyl] benzoicacid}phenylester (PTPTP). The blue phase liquid crystal material has a blue phase temperature range widened to an extremely low temperature. A blue phase liquid crystal composition and a method for manufacturing the blue phase liquid crystal material by using the blue phase liquid crystal composition are also provided.

18 Claims, No Drawings

BLUE PHASE LIQUID CRYSTAL COMPOSITION, BLUE PHASE LIQUID CRYSTAL MATERIAL AND METHOD FOR MANUFACTURING THEREOF

CROSS-REFERENCE TO RELATED APPLICATION

This application claims priority of Chinese Patent Application No. 201110420544.X filed on Dec. 15, 2011. The entirety of the above-mentioned Chinese patent application is hereby incorporated by reference herein and made a part of this specification.

FIELD OF THE INVENTION

The present invention relates to a liquid crystal material, and particularly to a blue phase liquid crystal composition, a blue phase liquid crystal material manufactured by the blue phase liquid crystal composition and a method for manufacturing the blue phase liquid crystal material.

BACKGROUND OF THE INVENTION

Blue phase liquid crystal has been widely paid attention to and developed because the blue phase liquid crystal have a highly fluidal self-assembled three-dimensional (3D) lattice structure, whose lattice parameters are easy to be changed so as to make the blue phase liquid crystal to have different photoelectric properties. In order to widen a blue phase temperature range of the blue phase liquid crystal for being adaptable to more applications, currently, two technologies for widening the temperature range of the blue phase liquid crystal are developed. The first blue phase liquid crystal temperature range widening technology is via the stabilizing of the lattice defects of the blue phase liquid crystal. For example, Kikuchi et al. disclose a polymer-stabilized blue phase liquid crystal, whose blue phase temperature range is up to 60° C. at room temperature (Kikuchi H, Yokota M, Hisakado Y, Yang H, Kajiyama T, 2002, Nat. Mater. 1, 64). The second blue phase liquid crystal temperature range widening technology is synthesizing the blue phase liquid crystal with wide temperature range by molecular designing. For example, Coles et al. design and synthesize a fluorine-substituted dimer liquid crystal molecule, whose blue phase temperature range is up to 44° C. at the room temperature (Coles H J, Pivnenko M N, Nature, 436(18), 997).

Although the two current conventional types of technologies for widening temperature range for blue phase liquid crystal can widen the blue phase temperature range of the blue phase liquid crystal, and the blue phase temperature range of the blue phase liquid crystal is usually (required to be) widened at room temperature. In other words, the current blue phase liquid crystal cannot be applied or used at an extreme low temperature. Therefore, the application of the blue phase liquid crystal, especially, for actual application at an extreme low temperature, is rather limited or beyond reach.

SUMMARY OF THE INVENTION

The present invention is directed to a blue phase liquid crystal material having a blue phase temperature range widened to an extreme low temperature.

The present invention is further directed to a blue phase liquid crystal composition for manufacturing the blue phase liquid crystal material having a blue phase temperature range widened to the extreme low temperature.

The present invention is further directed to a method for manufacturing the blue phase liquid crystal material having the blue phase temperature range widened to the extreme low temperature.

The present invention provides a blue phase liquid crystal material including a liquid crystal host, a chiral reagent and a stable polymer. The chiral reagent is

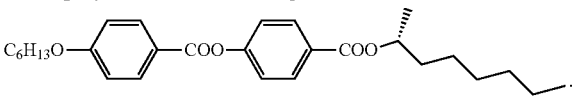

The stable polymer is formed by photo-polymerizing a first monomer and a second monomer. The first monomer is

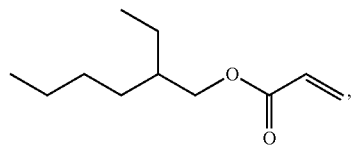

and the second monomer is

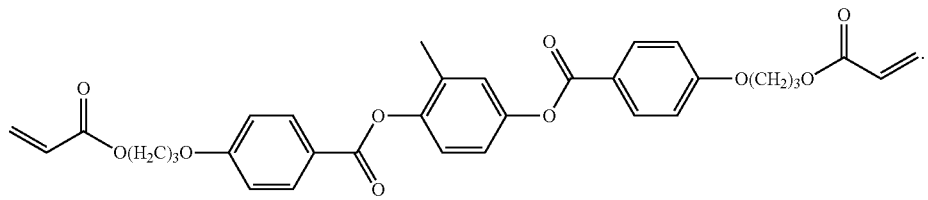

The present invention further provides a blue phase liquid crystal composition including a liquid crystal host, a chiral reagent, a first monomer, a second monomer and a photoinitiator. The chiral reagent is

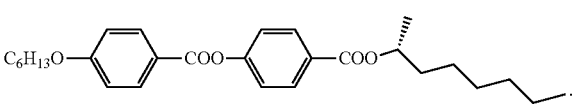

The first monomer is

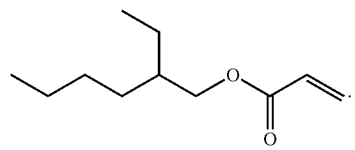

The second monomer is

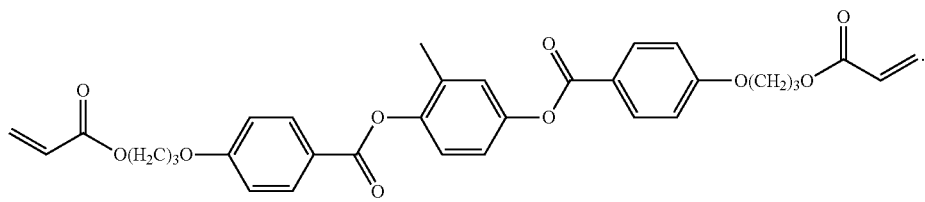

The present invention also provides a method for manufacturing the blue phase liquid crystal material. At first, a liquid crystal host, a chiral reagent, a first monomer, a second monomer and a photoinitiator are mixed uniformly to prepare a mixture. The chiral reagent is

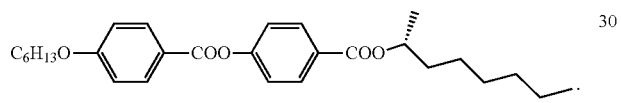

The first monomer is

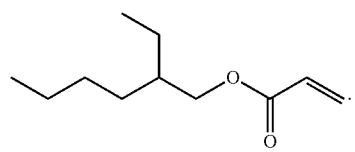

The second monomer is

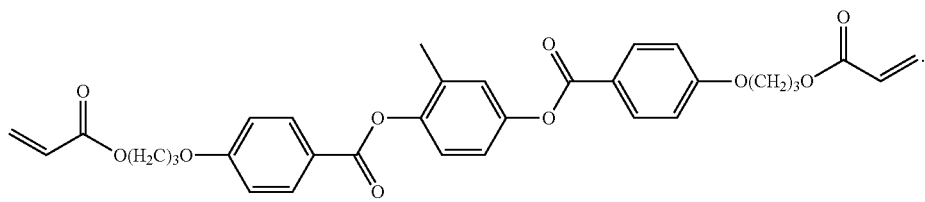

Then, the mixture is heated to form an isotropic mixture. Thereafter, the isotropic mixture is cooled at a constant cooling rate. The cooled isotropic mixture has a blue phase temperature range. Next, the cooled isotropic mixture is irradiated at a constant temperature by an ultraviolet light in the blue phase temperature range.

In the present invention, in the blue phase liquid crystal composition, the blue phase liquid crystal material and the method thereof, the first monomer

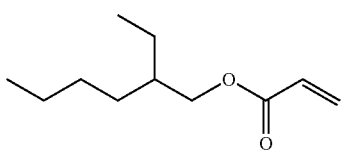

and the second monomer

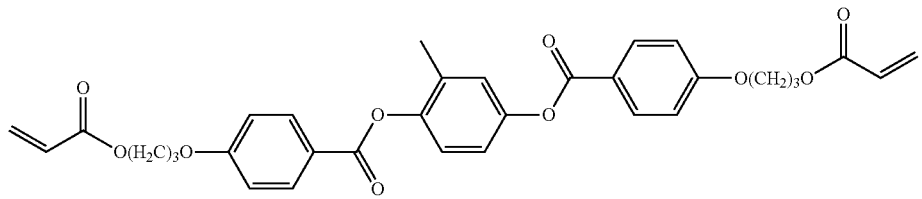

are used. The first monomer and the second monomer are photo-polymerized by a photo-polymerizing reaction initiated by the photoinitiator so as to form the stable polymer. The stable polymer is mixed with the liquid crystal host and the chiral reagent to form the blue phase liquid crystal material so that the blue phase temperature width of the blue phase liquid crystal material is effectively widened, for example, the blue phase temperature width is greater than 69° C. Furthermore, the blue phase temperature range of the blue phase liquid crystal material can be widened to an extreme low temperature, for example, at least −35° C. Thus, the blue phase liquid crystal material can be applied or used at the extreme low temperature, thereby increasing the application range or scope of the blue phase liquid crystal material. In addition, the electric field hysteresis effect of the blue phase liquid crystal material is decreased. The blue phase liquid crystal material can be applied to a display device so as to effectively improve the performance of the display device.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

A blue phase liquid crystal composition, a blue phase liquid crystal material and a method for manufacturing the blue phase liquid crystal material by using the blue phase liquid crystal composition are described. At first, according to the blue phase liquid crystal composition, a series of components, including a liquid crystal host, a chiral reagent, a first monomer, a second monomer and a photoinitiator, of the blue phase liquid crystal composition are mixed uniformly so as to form a mixture.

The blue phase liquid crystal composition includes the liquid crystal host, the chiral reagent, the first monomer, the second monomer and the photoinitiator. The liquid crystal host is, for example, a liquid crystal TLC 300, which includes 4-amyl-4'-cyano-biphenyl (represented by a molecular structural formula:

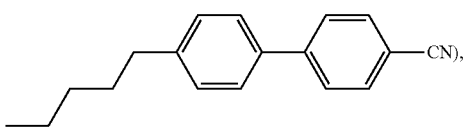

4-amyl-4'-cyanoter-phenyl (represented by a molecular structural formula:

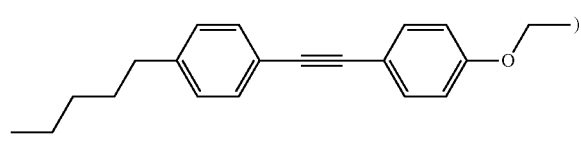

4-amyl phenyl-4'-ethoxyphenyl-acetylene (represented by a molecular structural formula:

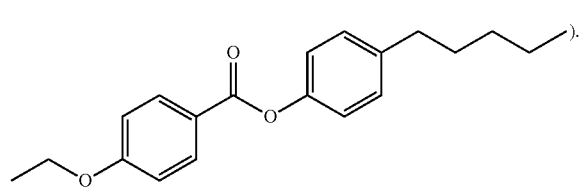 [SMILES: CCCCCc1ccc(OC(=O)c2ccc(OCC)cc2)cc1]

and 4-ethoxybenzoic acid-(4'-amyl)phenylester (represented by a molecular structural formula:

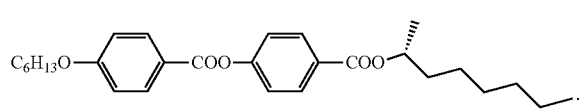

The chiral reagent is chiral reagent R811 represented by a molecular structural formula:

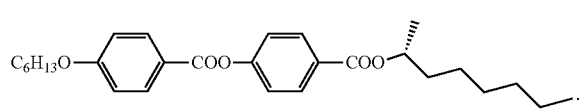

The first monomer is 2-ethylhexyl acrylate (2-EHA) represented by a molecular structural formula:

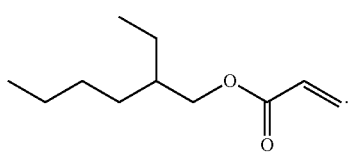

The second monomer is 2-methyl-1,4-bis{4-[3(-acrylate)propoxyl]benzoic acid}phenylester (PTPTP) represented by a molecular structural formula:

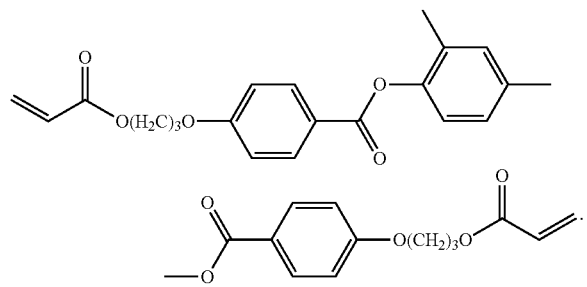

A weight ratio of the first monomer to the second monomer is in a range from 1:1.75 to 1:2.25. Preferably, the weight ratio of the first monomer to the second monomer is 1:2. In addition, a weight percent of the first monomer and the second monomer in the blue phase liquid crystal composition is in a range from 5% to 12%. The photoinitiator is an ultraviolet photoinitiator, for example, IGRACURE 184. A weight percentage of the photoinitiator in the blue phase liquid crystal composition is from 0.4% to 0.7%. The remaining portion or weight percentage of the blue phase liquid crystal composition includes the liquid crystal host and the chiral reagent. A weight ratio of the liquid crystal host to the chiral reagent is in a range from 2.6:1 to 3.5:1. Preferably, the weight ratio of the liquid crystal host to the chiral reagent is 3:1. The abovementioned components of the blue phase liquid crystal composition can be received in a container, and be heated and stirred by a magnetic stirring device to be mixed uniformly, thereby obtaining the mixture.

Then, the mixture is heated to form an isotropic mixture. For example, the mixture is poured into a liquid crystal cell, and the liquid crystal cell is placed on a hot and cold stage to be heated so that the mixture in the liquid crystal cell is transformed into the isotropic mixture.

Thereafter, the isotropic mixture is cooled at a constant cooling rate. For example, the liquid crystal cell having the isotropic mixture is remained on the hot and cold stage to be cooled. During cooling, a cooling rate is controlled by the hot and cold stage so that the isotropic mixture is cooled at the constant cooling rate. The cooled isotropic mixture has a blue phase temperature range from T1 to T2, T1 is a lower limit temperature of the blue phase temperature range, and T2 is the upper limit temperature of the blue phase temperature range.

After that, the cooled isotropic mixture is irradiated at a constant temperature by an ultraviolet light in the blue phase temperature range, thereby obtaining the blue phase liquid crystal material. In other words, in the step of irradiating the cooled isotropic mixture by an ultraviolet light, an irradiating temperature $T_{UV}$ is configured to be located in the blue phase temperature range. That is, the irradiating temperature $T_{UV}$ is between the lower limit temperature T1 and the upper limit temperature T2. Preferably, the irradiating temperature $T_{UV}$ is higher than the lower limit temperature T1 by about 1° C. to 2° C. Additionally, in the step of irradiating the cooled isotropic mixture by the ultraviolet light, an irradiating time is in a range from 3 minutes to 12 minutes and an irradiating energy is in a range from 8 mw/cm$^2$ to 10 mw/cm$^2$. Due to the irradiation at the constant temperature under the ultraviolet light, the photo-polymerization reaction of the first monomer and the second monomer is initiated by the photoinitiator. Thus, the first monomer and the second monomer are photo-polymerized to form the stable polymer, which is mixed with the liquid crystal host and the chiral reagent to form the blue phase liquid crystal material.

The blue phase liquid crystal material manufactured by the above described method has a blue phase temperature range from T1 to T2, in which T1 is a lower limit temperature of the blue phase temperature range, and T2 is the upper limit temperature of the blue phase temperature range. The blue phase temperature width (T2−T1) (i.e., a temperature difference between the upper limit temperature T2 and the lower limit temperature T1) of the blue phase liquid crystal material is greater than 69° C. Further, the lower limit temperature T1 of the blue phase temperature range of the blue phase liquid crystal material is at least dropped down to about −35° C. Thus, not only the blue phase temperature range of the blue phase liquid crystal material is being widened, but also the blue phase temperature range of the blue phase liquid crystal material is widened to reach an extreme low temperature. Therefore, the blue phase liquid crystal material can be applied or used under extreme low temperature conditions.

Example 1

83.7 mg 2-EHA and 167.4 mg PTPTP are received in a container, for example, a vial for containing penicillin. Then, a small stirrer is placed into the container, and the 2-EHA and the PTPTP are heated and stirred by using a magnetic stirring device so as to be mixed uniformly, thereby obtaining a monomer mixture.

85.4 mg liquid crystal TLC 300 and 28.5 mg chiral reagent R811 are received in a container, for example, a vial for containing penicillin. Then, 6.0 mg monomer mixture and 0.6 mg ultraviolet photoinitiator are also added into the container. Then, a stirrer is placed into the container, and the liquid crystal TLC 300, the chiral reagent R811, the monomer mixture and the ultraviolet photoinitiator are heated and stirred by using the magnetic stirring device so as to be mixed uniformly, thereby obtaining a mixed solution. Next, the mixed solution is poured into a liquid crystal cell, and the liquid crystal cell is placed on a hot and cold stage to be heated so that the mixture in the liquid crystal cell is transformed into an isotropic mixture. Thereafter, the isotropic mixture is cooled at a constant cooling rate, for example, 0.5° C./min, which is controlled by the hot and cold stage. The cooled isotropic mixture has a blue phase temperature range from T1 to T2, T1 is, for example, 31° C.; and T2 is, for example, 35° C. After that, the cooled isotropic mixture is irradiated at a constant temperature by an ultraviolet light. An irradiating temperature is, for example, 32° C. An irradiating energy is, for example, 8.31 mw/cm$^2$ and an irradiating time is, for example, 10 minutes. Thus, the blue phase liquid crystal material can be obtained. Next, the blue phase temperature range of the blue phase liquid crystal material is tested, the blue phase temperature range of the blue phase liquid crystal material is from T1 to T2, T1 is a lower limit temperature of the blue phase temperature range, for example, −35° C.; and T2 is the upper limit temperature of the blue phase temperature range, for example, 34° C. That is, in the present example, the blue phase temperature width (T2−T1) of the blue phase liquid crystal material is 69° C. It is noted that, testing of the lower limit temperature of the blue phase temperature range is limited or constrained by the existing functional capability of conventional testing device or equipment, because the current testing device can not operate at a temperature lower than −35° C. Although the tested lower limit temperature of the blue phase temperature range is −35° C. in the present example, it is submitted that the blue phase liquid crystal material may still be in a blue phase state at a temperature lower than −35° C. Thus, the lower limit temperature T1 of the blue phase temperature range is at least dropped down to, for example, −35° C.; and the blue phase temperature width (T2−T1) is greater than 69° C.

Example 2

Example 2 is similar to Example 1 except that an irradiating time is, for example, 5 minutes. It is tested in Example 2 that the blue phase temperature range of the blue phase temperature range is from T1 to T2, T1 is a lower limit temperature of the blue phase temperature range, for example, −35° C.; and T2 is the upper limit temperature of the blue phase temperature range, for example, 34° C. That is, in the present example, the blue phase temperature width (T2−T1) of the blue phase liquid crystal material is grater than 69° C. In other examples, the irradiating time can be, for example, 3 minutes, 6 minutes, or 12 minutes. It is tested that the blue phase temperature ranges of the blue phase liquid crystal materials are still configured to be from T1 to T2, T1 is a lower limit temperature of the blue phase temperature range, for example, −35° C.; and T2 is the upper limit temperature of the blue phase temperature range, for example, 34° C. That is, in the present example, the blue phase temperature widths (T2−T1) of the blue phase liquid crystal materials all are greater than 69° C. In other words, the irradiating time/duration in a range from 3 minutes to 12 minutes will not evidently affect the blue phase temperature range of the blue phase liquid crystal material.

Example 3

83.7 mg 2-EHA and 188.3 mg PTPTP are received in a container, for example, a vial for containing penicillin. Then, a small stirrer is placed into the container, and the 2-EHA and the PTPTP are heated and stirred by using a magnetic stirring device so as to be mixed uniformly, thereby obtaining a monomer mixture.

90.6 mg liquid crystal TLC 300 and 30.2 mg chiral reagent R811 are received in a container, for example, a vial for containing penicillin. Then, 13.5 mg monomer mixture and 0.7 mg ultraviolet photoinitiator are also added into the container. Then, a stirrer is placed into the container, and the liquid crystal TLC 300, the chiral reagent R811, the monomer mixture and the ultraviolet photoinitiator are heated and stirred by using the magnetic stirring device so as to be mixed uniformly, thereby obtaining a mixture. Next, the mixture is poured into a liquid crystal cell, and the liquid crystal cell is placed on a hot and cold stage to be heated so that the mixture in the liquid crystal cell is transformed into an isotropic mixture. Thereafter, the isotropic mixture is cooled at a constant cooling rate, for example, 0.5° C./min, which is controlled by the hot and cold stage. The cooled isotropic mixture has a blue phase temperature range from T1 to T2, T1 is, for example, 32° C.; and T2 is, for example, 36° C. After that, the cooled isotropic mixture is irradiated by an ultraviolet light. An irradiating temperature $T_{UV}$ is, for example, 34° C. An irradiating energy is, for example, 8.31 mw/cm² and an irradiating time is, for example, 10 minutes. Thus, the blue phase liquid crystal material can be obtained. Next, it is tested that the blue phase temperature range of the blue phase liquid crystal material is from T1 to T2, in which T1 is a lower limit temperature of the blue phase temperature range, for example, −35° C.; and T2 is the upper limit temperature of the blue phase temperature range, for example, 35° C. That is, in the present example, the blue phase temperature width (T2−T1) of the blue phase liquid crystal material is 70° C. It is noted that, the testing of the lower limit temperature of the blue phase temperature range is limited or constrained by the capability of conventional testing device, because the current conventional testing device cannot operate down to a test temperature lower than −35° C. Although the tested lower limit temperature of the blue phase temperature range performed in the present example is −35° C., it is submitted that the blue phase liquid crystal material may be still in a blue phase state at a temperature lower than −35° C. Thus, the lower limit temperature T1 of the blue phase temperature range is at least down to, for example, −35° C.; and the blue phase temperature width (T2−T1) is greater than 70° C.

Additionally, in Example 3, a weight percent of the monomer mixture in the blue phase liquid crystal composition is 10%. In other examples, referring to Table 1, the weight percent of the monomer mixture in the blue phase liquid crystal composition can be, for example, 5%, 7%, or 12%, respectively. As shown in Table 1, the blue phase temperature widths (T2−T1) of the blue phase liquid crystal materials all are greater than 69° C.

TABLE 1

| NO. | liquid crystal host | monomer mixture | photoinitiator | blue phase temperature width |
|---|---|---|---|---|
| 1 | 94.5 wt % | 5 wt % | 0.5 wt % | >69° C. |
| 2 | 92.5 wt % | 7 wt % | 0.5 wt % | >69° C. |
| 3 | 89.5 wt % | 10 wt % | 0.5 wt % | >69° C. |
| 4 | 87.5 wt % | 12 wt % | 0.5 wt % | >69° C. |

It is noted that, the electric field hysteresis effect of the blue phase liquid crystal material manufactured by the above described method is decreased down to 1.1V. Thus, the blue phase liquid crystal material can be applied to or used in a display device so as to effectively improve the performance of the display device.

In summary, in the blue phase liquid crystal composition, the blue phase liquid crystal material and the method for manufacturing the blue phase liquid crystal material of the present invention, the first monomer

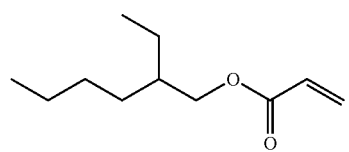

and the second monomer

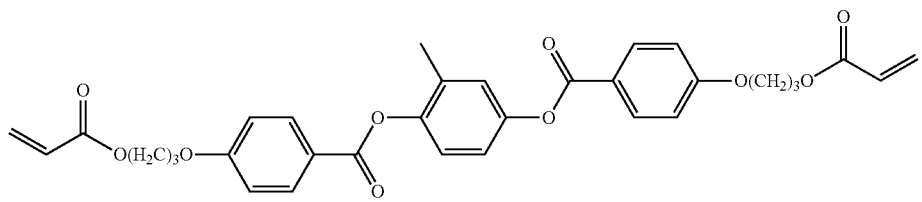

are used. The first monomer and the second monomer are polymerized by a photo-polymerizing reaction initiated by the photoinitiator so as to form a stable polymer. The stable polymer is mixed with the liquid crystal host and the chiral reagent to form a blue phase liquid crystal material so that the blue phase temperature width of the blue phase liquid crystal material is widened effectively, for example, the blue phase temperature width is greater than 69° C. Furthermore, the blue phase temperature range of the blue phase liquid crystal material can be widened to an extreme low temperature, for example, at least −35° C. Thus, the blue phase liquid crystal material can be applied at an extreme low temperature, thereby increasing the application fields, scope or range of the blue phase liquid crystal material. In addition, the electric field hysteresis effect of the blue phase liquid crystal material can be decreased. The blue phase liquid crystal material can be applied to a display device so as to effectively improve the performance of the display device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A blue phase liquid crystal material, comprising:
a liquid crystal host;
a chiral reagent, the chiral reagent being

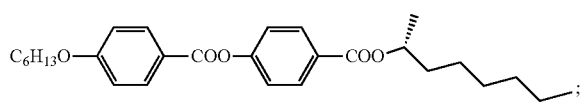

and
a polymer, the polymer being formed by photo-polymerizing a first monomer and a second monomer, the first monomer being

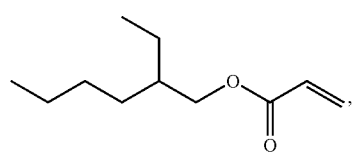

and the second monomer being

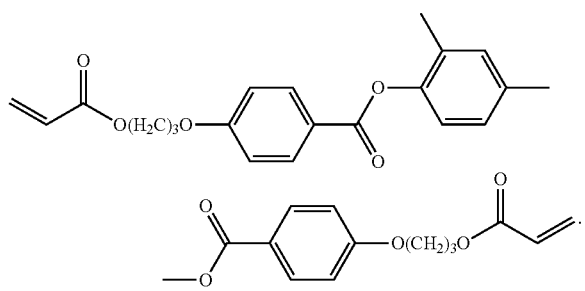

2. The blue phase liquid crystal material of claim 1, wherein a blue phase temperature range of the blue phase liquid crystal material is greater than 69° C.

3. The blue phase liquid crystal material of claim 2, wherein a lower limit temperature of a blue phase temperature range of the blue phase liquid crystal material is at least down to −35° C.

4. A blue phase liquid crystal composition, comprising:
a liquid crystal host;
a chiral reagent, the chiral reagent being

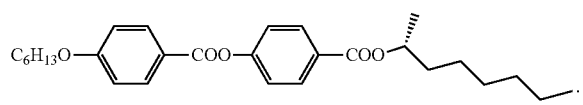

a first monomer, the first monomer being

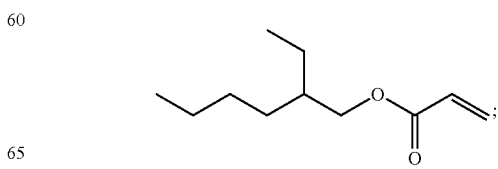

a second monomer, the second monomer being

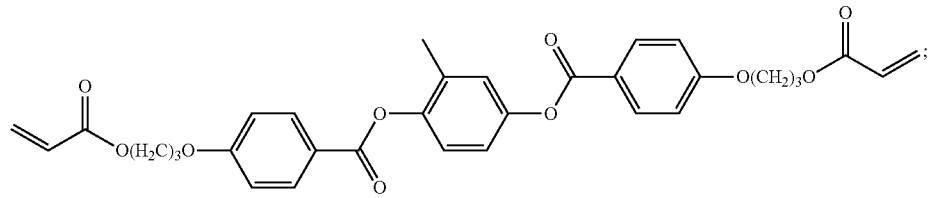

and
a photoinitiator.

5. The blue phase liquid crystal composition of claim 4, wherein a weight ratio of the first monomer to the second monomer is in a range from 1:1.75 to 1:2.25.

6. The blue phase liquid crystal composition of claim 5, wherein the weight ratio of the first monomer to the second monomer is 1:2.

7. The blue phase liquid crystal composition of claim 4, wherein a weight percent of the first monomer and the second monomer in the blue phase liquid crystal composition is in a range from 5% to 12%.

8. The blue phase liquid crystal composition of claim 4, wherein the photoinitiator is an ultraviolet photoinitiator, and a weight percent of the photoinitiator in the blue phase liquid crystal composition is in a range from 0.4% to 0.7%.

9. The blue phase liquid crystal composition of claim 4, wherein a weight ratio of the liquid crystal host to the chiral reagent is in a range from 2.6:1 to 3.5:1.

10. A method for manufacturing blue phase liquid crystal material, comprising:
   mixing a liquid crystal host, a chiral reagent, a first monomer, a second monomer and a photoinitiator uniformly to prepare a mixture, wherein the chiral reagent is

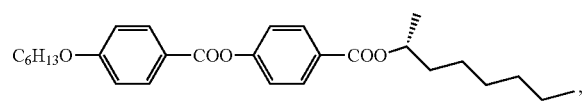

the first monomer is

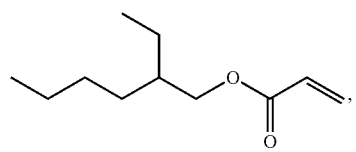

and the second monomer is

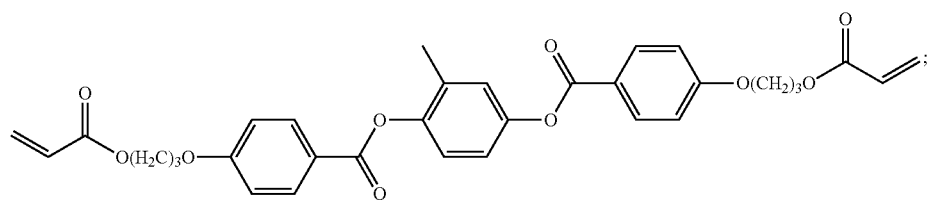

heating the mixture to form an isotropic mixture;
cooling the isotropic mixture at a constant cooling rate so that the cooled isotropic mixture has a blue phase temperature range; and
irradiating the cooled isotropic mixture at a constant temperature by an ultraviolet light in the blue phase temperature range.

11. The method for manufacturing the blue phase liquid crystal material of claim 10, wherein a weight ratio of the first monomer to the second monomer is in a range from 1:1.75 to 1:2.25.

12. The method for manufacturing the blue phase liquid crystal material of claim 10, wherein a weight ratio of the first monomer to the second monomer is 1:2.

13. The method for manufacturing the blue phase liquid crystal material of claim 10, wherein a weight percent of the first monomer and the second monomer in the blue phase liquid crystal composition is in a range from 5% to 12%.

14. The method for manufacturing the blue phase liquid crystal material of claim 10, wherein the photoinitiator is an ultraviolet photoinitiator, and a weight percent of the photoinitiator to the blue phase liquid crystal composition is in a range from 0.4% to 0.7%.

15. The method for manufacturing the blue phase liquid crystal material of claim 10, wherein a weight ratio of the liquid crystal host to the chiral reagent is in a range from 2.6:1 to 3.5:1.

16. The method for manufacturing the blue phase liquid crystal material of claim 10, wherein an irradiating temperature during irradiating at a constant temperature by the ultraviolet light is higher than a lower limit temperature of the blue phase temperature range of the cooled isotropic mixture by about 1° C. to 2° C.

17. The method for manufacturing the blue phase liquid crystal material of claim 10, wherein the constant cooling rate is 0.5° C./min.

18. The method for manufacturing the blue phase liquid crystal material of claim 10, wherein an irradiating time during irradiating at a constant temperature by an ultraviolet light is in a range from 3 minutes to 12 minutes, and an irradiating energy is in a range from 8 mW/cm$^2$ to 10 mW/cm$^2$.

* * * * *